United States Patent
Huang et al.

(10) Patent No.: US 9,696,337 B2
(45) Date of Patent: Jul. 4, 2017

(54) MEMS-BASED PROXIMITY SENSOR DEVICE AND METHOD

(71) Applicant: mCube Inc., San Jose, CA (US)

(72) Inventors: Kevin Huang, Taipei (TW); Chenglong Fu, Taipei (TW); Tan Liang, Taipei (TW)

(73) Assignee: mCube Inc., San Jose, CA (US)

( * ) Notice: Subject to any disclaimer, the term of this patent is extended or adjusted under 35 U.S.C. 154(b) by 420 days.

(21) Appl. No.: 14/194,468

(22) Filed: Feb. 28, 2014

(65) Prior Publication Data

US 2015/0268025 A1    Sep. 24, 2015

Related U.S. Application Data

(60) Provisional application No. 61/829,115, filed on May 30, 2013.

(51) Int. Cl.
| | |
|---|---|
| *G06F 3/0346* | (2013.01) |
| *G01P 15/00* | (2006.01) |
| *G06F 3/01* | (2006.01) |
| *H04M 1/725* | (2006.01) |
| *G01P 15/18* | (2013.01) |

(52) U.S. Cl.
CPC .............. *G01P 15/00* (2013.01); *G06F 3/017* (2013.01); *G06F 3/0346* (2013.01); *H04M 1/72569* (2013.01); *G01P 15/18* (2013.01); *H04M 2250/22* (2013.01)

(58) Field of Classification Search
CPC .......... G01P 15/00; G01P 15/18; G01P 13/00; G01P 15/14; G06F 3/017; G06F 3/0346; G06T 1/0007; H04M 2250/12; G01C 19/00; G01R 33/0286
See application file for complete search history.

(56) References Cited

U.S. PATENT DOCUMENTS

| 2008/0252444 A1 | 10/2008 | Batot et al. | |
|---|---|---|---|
| 2011/0050446 A1 | 3/2011 | Anderson et al. | |
| 2014/0188638 A1* | 7/2014 | Jones et al. | 705/16 |

FOREIGN PATENT DOCUMENTS

| CN | 102833414 | 12/2012 | |
|---|---|---|---|
| CN | 104219346 | * 12/2014 | ........... G06F 3/0346 |
| TW | M416177 U | 11/2011 | |
| TW | 201240402 A | 10/2012 | |

OTHER PUBLICATIONS

Taiwan Patent Office Office Action for patent application TW103117391 (Aug. 29, 2015).
CN201410221665.5, "Office Action", Aug. 23, 2016, 7 pages.

* cited by examiner

*Primary Examiner* — Huan Tran
(74) *Attorney, Agent, or Firm* — Kilpatrick Townsend & Stockton LLP

(57) ABSTRACT

A portable proximity device and method of operation thereof. The method for proximity detection implemented on a portable device can include determining an initial perturbation data, a tracking point data, and a stable position data with a physical sensor of the portable device. The initial perturbation data can include previous state data and current state data. The tracking point data can include one or more track data. An action to be performed can be determined, by a processor within the portable device, based on the initial perturbation data, the tracking point data, and the stable position data. The portable proximity device can include a physical sensor and a processor configured to perform these steps.

30 Claims, 10 Drawing Sheets

$$\text{if } |CurrentX - PreviousX| > \frac{\text{SENSITIVITY}}{\text{xShakeParm}}$$

$$|CurrentY - PreviousY| > \frac{\text{SENSITIVITY}}{\text{yShakeParm}}$$

$$|CurrentZ - PreviousZ| > \frac{\text{SENSITIVITY}}{\text{zShakeParm}}$$

FIG. 1

$$\text{if } |TrackData[1st][X] - TrackData[last][X]| > \frac{\text{SENSITIVITY}}{\text{xMoveParm}}$$

$$|TrackData[1st][Y] - TrackData[last][Y]| > \frac{\text{SENSITIVITY}}{\text{yMoveParm}}$$

$$|TrackData[1st][Z] - TrackData[last][Z]| > \frac{\text{SENSITIVITY}}{\text{zMoveParm}}$$

FIG. 2 if $\left(\dfrac{\text{SENSITIVITY}}{\text{XPositionParm}}\right)$ < AccX < (SENSITIVITY + XOFFSET)

or if (-SENSITIVITY - XOFFSET) < AccX < $\left(\dfrac{\text{SENSITIVITY}}{\text{XPositionParm}}\right)$

FIG. 3 if $\left(\dfrac{\text{SENSITIVITY}}{\text{YPositionParm}}\right)$ < AccY < (SENSITIVITY + YOFFSET)

or if (-SENSITIVITY - YOFFSET) < AccY < $\left(\dfrac{\text{SENSITIVITY}}{\text{YPositionParm}}\right)$

FIG. 4 if $\left(\dfrac{\text{-(SENSITIVITY + ZOFFSET)}}{\text{ZPositionParmNeg}}\right)$ < AccZ < $\left(\dfrac{\text{SENSITIVITY + ZOFFSET}}{\text{ZPositionParmPos}}\right)$

FIG. 5

MEMS-BASED PROXIMITY SENSOR DEVICE AND METHOD

CROSS-REFERENCE TO RELATED APPLICATIONS

The present application claims priority to and incorporates by reference, for all purposes, the following patent application: U.S. Provisional App. 61/829,115, filed May 30, 2013.

BACKGROUND OF THE INVENTION

The present invention is directed to applications of integrated circuit (IC) and MEMS (Micro-Electro-Mechanical-Systems) devices. More specifically, embodiments of the invention provide methods and devices for integrated MEMS sensor devices, which can be implemented in mobile phones, tablets, hand-held computers, and the like. Merely by way of example, the MEMS devices can include at least an accelerometer, a gyroscope, an inertial sensor, a magnetic field sensor, and others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to applications of integrated circuit (IC) and MEMS (Micro-Electro-Mechanical-Systems) devices. More specifically, embodiments of the invention provide methods and structures for integrated MEMS sensor devices, which can be implemented in mobile phones, tablets, hand-held computers, and the like. Merely by way of example, the MEMS devices can include at least an accelerometer, a gyroscope, an inertial sensor, and magnetic field sensor, and others. But it will be recognized that the invention has a much broader range of applicability.

The present invention includes a MEMS-based proximity sensor device and methods of operation. The following describes an embodiment of the various steps in a method of operating the MEMS-based proximity sensor. The method can include using a virtual proximity sensor and a service daemon as a substitution for a proximity sensor hardware IC during a phone call. In an example, this virtual proximity sensor can be used for turning a mobile phone's display "On" or "Off," reducing a back-light, or the like. Other electronic devices, touchscreen devices, and the like, can be used as well. In an embodiment, the screen backlight of a mobile phone will be turned off when a user gets close with the headset during a phone call. On the other hand, the screen will be turned on immediately after the user gets far away, and the screen will be turned off when the user's ear gets close.

In an embodiment, the present invention includes a portable proximity device and method of operation thereof. The method for proximity detection implemented on a portable device can include determining an initial perturbation data, a tracking point data, and a stable position data with a physical sensor of the portable device. The initial perturbation data can include previous state data and current state data. The tracking point data can include one or more track data. An action to be performed can be determined, by a processor within the portable device, based on the initial perturbation data, the tracking point data, and the stable position data. The portable proximity device can include a physical sensor and a processor configured to perform these steps.

Many benefits are achieved by the way of the present invention over conventional techniques. The present invention includes a MEMS-based proximity sensor device and methods of operation. The method can include using a virtual proximity sensor and a service daemon as a substitution for a proximity sensor hardware IC during a phone call. In an example, this virtual proximity sensor can be used for turning a mobile phone's display "On" or "Off". Other electronic devices, touchscreen devices, and the like, can be used as well. In an embodiment, the screen backlight of a mobile phone will be turned off when a user gets close with the headset during a phone call. On the other hand, the screen will be turned on immediately after the user gets far away, and the screen will be turned off when the user's ear gets close.

In various embodiments, one or more profiles of movement of the mobile device may be pre-determined. One such example of a profile may include a mobile device, or the like being moved in an arc or curve from a horizontal or vertical position, upwards, and being maintained in a stable upwards position. Such a profile may be based upon a user picking up their phone, moving the phone towards their head, and then talking with the phone next to their head. In various embodiments, subsequent movements of the mobile device, determined via MEMS sensors, or the like, are compared to the one or more profiles. In some embodiments, when there is an approximate match, a status flag, or the like may be set. Subsequently an operating system process, e.g. daemon, process, may perform an action in response to the indicator, e.g. turn off a display, hang-up a telephone call, or the like.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 1 illustrates a simplified formula for initial movement detection according to an embodiment of the present invention.

FIG. 2 illustrates a simplified formula for tracking point detection according to an embodiment of the present invention.

FIG. 3 illustrates a simplified formula for sensor data checking according to an embodiment of the present invention.

FIG. 4 illustrates a simplified formula for sensor data checking according to an embodiment of the present invention.

FIG. 5 illustrates a simplified formula for sensor data checking according to an embodiment of the present invention.

DETAILED DESCRIPTION OF THE INVENTION

Figure 6:
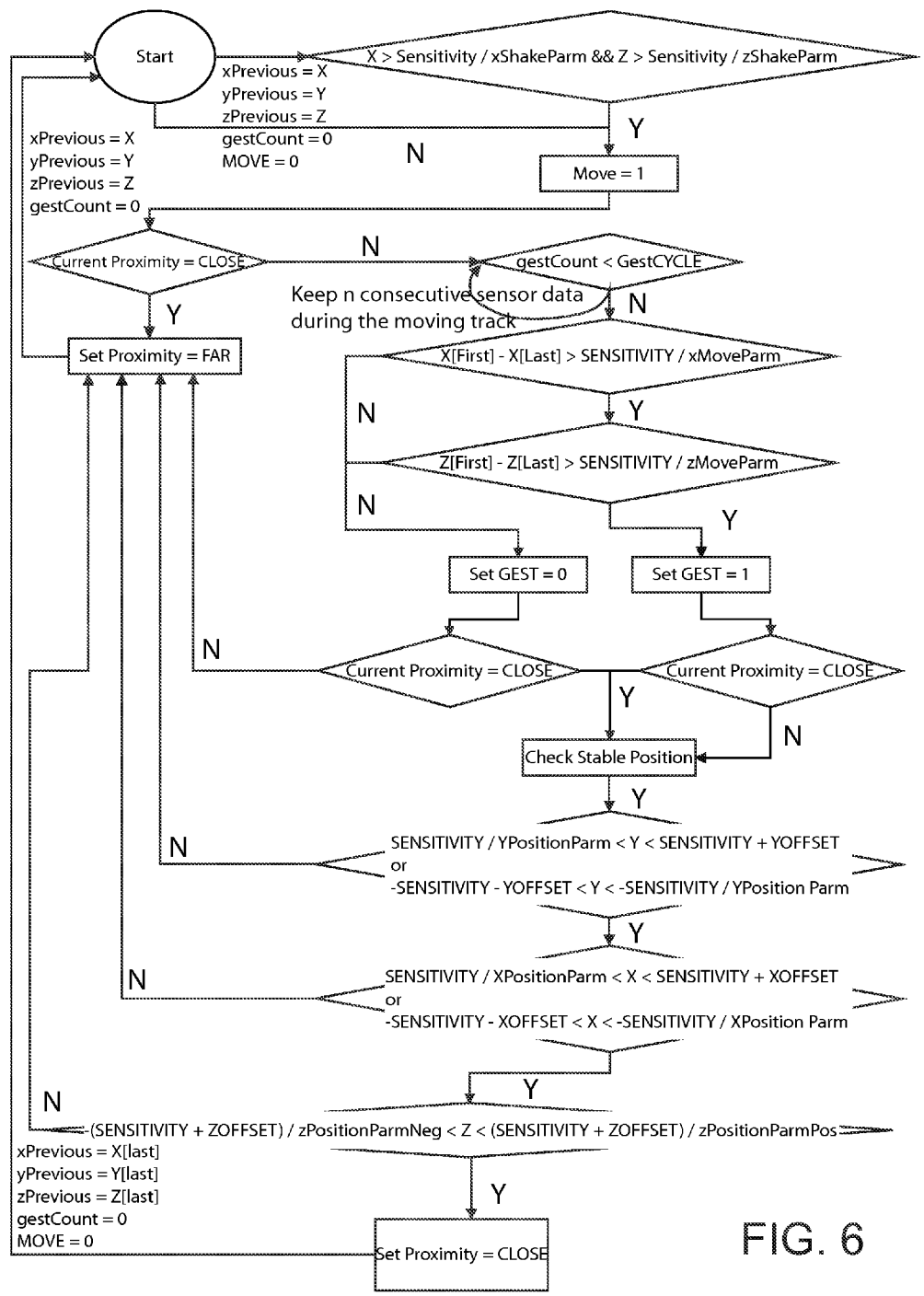
FIG. 6 illustrates a simplified flow diagram of a method for operating a MEMS proximity sensor device according to an embodiment of the present invention.

The present invention is directed to applications of integrated circuit (IC) and MEMS (Micro-Electro-Mechanical-Systems) devices. More specifically, embodiments of the invention provide methods and structures for integrated MEMS sensor devices, which can be implemented in mobile phones, tablets, hand-held computers, magnetic field sensor, and the like. Merely by way of example, the MEMS devices can include at least an accelerometer, a gyroscope, an inertial sensor, and others. But it will be recognized that the invention has a much broader range of applicability.

Proximity sensors are commonly used in smartphone devices, especially those having touchscreens. A primary function of the proximity sensor in such a device is to disable accidental touch events. The most common scenario employing the proximity sensor is the ear coming in contact with the screen and generating touch events while the user is on a call.

The present invention includes a MEMS-based proximity sensor device and methods of operation. The following describes an embodiment of the various steps in a method of operating the MEMS-based proximity sensor. The method can include using a virtual proximity sensor and a service daemon as a substitution for a proximity sensor hardware IC during a phone call. In an example, this virtual proximity sensor can be used for turning a mobile phone's display "On" or "Off". Other electronic devices, touchscreen devices, and the like, can be used as well. In an embodiment, the screen backlight of a mobile phone will be turned off when a user gets close with the headset during a phone call. On the other hand, the screen will be turned on immediately after the user gets far away, and the screen will be turned off when the user's ear gets close.

In a specific embodiment, the MEMS-based proximity sensor device can include an Accelerometer-based proximity sensor and the method of operation can include utilizing the accelerometer sensor data to detect the user's gesture and movement on the headset for two phases, and get a proximity event only when the proximity changes (either NEAR to FAR or FAR to NEAR). The proximity value related to these proximity changes can be calculated by a service daemon using accelerometer data.

Step 1: Detect the Movement in the Very Beginning—

Detect the gesture from anywhere to the vicinity of the ear, which takes X, Y, and Z axis values into the gesture detection model. And we compare the difference of X, Y, and Z axis values ("CurrentX", "CurrentY", and "CurrentZ") with its initial value ("PreviousX", "PreviousY", and "PreviousZ") before moving and the value immediately caught at the first movement. If we sense that the device is starting to move, then we sample a two or more of points of (x, y, z) axis values during the moving track from anywhere getting close to the vicinity of the ear (i.e. from the front of the human body to getting close to the ear). The two or more of points can include any integer greater than 2 as an example. In a specific embodiment, the two or more points can include 5 consecutive points. Those of ordinary skill in the art will recognize various amounts of points depending on specific embodiments and applications.

FIG. 1 illustrates a simplified formula of initial movement detection according to an embodiment of the present invention. The "SENSITIVITY" value is the resolution of the MEMS device, such as an accelerometer, magnetic field sensor, gyro sensor, and the like. "xShakeParm", "yShakeParm", and "zShakeParm" are the designated parameters to the shake detection in the first beginning.

The device is assumed to start moving when passing the criteria that the absolute value of the difference of the "CurrentX" and "PreviousX" is bigger than a specific ratio, i.e., "SENSITIVITY"/"xShakeParm". In various embodiments, the passing criteria can be based on the difference of X, Y, or Z values, or combinations thereof. Of course, other variations, modifications, and alternative implementations can be used.

Step 2: Detect the Tracking Points from Anywhere to the Vicinity of the Ear—

Following success in Step 1, then the two or more consecutive points of (x, y, z) axis data are sampled to determine the device moving anywhere to the vicinity of the ear. The difference of the first point ("TrackData[$1^{st}$]") and the last point ("TrackData[last]") out of the two or more sampling points during the track will be compared. In various embodiments, the estimation should pass on any of the X, Y, or Z axes, or combinations thereof (e.g. X & Y, Y & Z, X & Z, or X, Y, & Z). In a specific embodiment, the estimation should pass both on the X and Z axis ([Xaxis], [Zaxis]).

FIG. 2 illustrates a simplified formula for tracking point detection according to an embodiment of the present invention. This formula describes several parameters. The "SENSITIVITY" is the resolution of the device IC. "xMoveParm", "yMoveParm", and "zMoveParm" are parameters based on movement criteria. Here, it is assumed that the device actually moves when passing the criteria for step 1 on the X, Y, and Z axis, which leads to the sampling of the two or more consecutive points for the step 2 data checking. If this data check is passed on X, Y, and Z (or any combination of checks on the X, Y, and Z axes), then step 3 is executed to verify the final position of the device.

Step 3: Check the Stable Position of the Sensor Data—

During user movement, the position of the sensor data is checked by using the last point kept by step 2. FIGS. 3-5 illustrate simplified formulas for the sensor data check according to an embodiment of the present invention. The last point of the movement track is compared with a heuristic boundary for X, Y, Z to obtain the best proximity status. The specific parameters for the stable position check phase of the sensor data include "XPositionParm", "YPositionParm", and "ZPositionParm". This checking step can include three steps to check the data for each axis (X, Y, Z), shown in FIGS. 3, 4, and 5, respectively.

The last point of X, Y, Z sensor data are assumed to be located near a range within a vicinity of the ear when passing the three criteria with the designed parameters and offset. Upon passing, the service daemon will immediately switch the proximity value at the computed proximity sensor driver. The system will turn on or off according to the proximity value, which is either NEAR to FAR or FAR to NEAR.

In various embodiments, when the points tracked in steps 1 and 2 resemble an arc or a curve from an initial position upwards, this may indicate that the user picking up a mobile device implementing embodiments of the present invention. Additionally, when the final, stable position of the device is in an upright and/or tilted position with respect to gravity in step 3, this may indicate that the user is holding the mobile device next to their head. Accordingly, in various embodiments, based upon the tracking points and the final/stable position, it can be inferred that certain combinations of movements represent the user answering a telephone call on their mobile device, (e.g. picking up a mobile device and positioning the mobile device next to their face). In such combinations of movements, embodiments of the present invention may indicate proximity of the mobile device next to the user's face, e.g. NEAR, which leads to the mobile device switching-off the display.

In various embodiments, while the mobile device is in approximately the stable position, the mobile device may maintain the NEAR proximity value, and the display may be maintained off, low backlight, backlight off, or the like. Subsequently, when the mobile device is moved away from the stable position, by monitoring tracking points, as discussed above, embodiments of the present invention may switch the proximity value to FAR. Accordingly, the activity of the display may be restored.

In some embodiments, different MEMS sensors may be used to determine the motion data. For example, in one embodiment, 3-access accelerometers may be used; in another example, gyroscopes may be used; in still other embodiments, sensors such as pressure sensors or magnetometers may be used.

FIG. 6 illustrates a simplified flow diagram of a method for operating a MEMS proximity sensor device according to an embodiment of the present invention. This flow diagram represents a specific embodiment of a method implementing the steps 1-3 described previously for FIGS. 1-5. In this case, the initial movement check of step 1 and the tracking point detection of step 2 are directed to a combination of checks on the X and Z axis. Also, the method is shown to sample of n consecutive sensor data during the moving track, where n is an integer greater than zero.

In an embodiment, the present invention includes a portable proximity device and method of operation thereof. This related device and method can be referred to as a "CallSense" device and method or "CallSense 1.0". The method for proximity detection implemented on a portable device can include determining an initial perturbation data, a tracking point data, and a stable position data with a physical sensor of the portable device. The initial perturbation data can include previous state data and current state data. The tracking point data can include one or more track data. An action to be performed can be determined, by a processor within the portable device, based on the initial perturbation data, the tracking point data, and the stable position data.

In a specific embodiment, the method can also include comparing the difference between the previous state data and the current state data to one or more first threshold values. Each of the one or more first threshold values can include a ratio between a sensitivity parameter and a shake detection parameter, as described for FIGS. 1 and 2. The initial perturbation data can include X-axis perturbation data and Z-axis perturbation data, as shown in FIG. 6. A Y-axis perturbation data can also be included. In this case, the one or more first threshold values includes an X-axis first threshold value and a Z-axis first threshold value. The X-axis first threshold value can include a ratio between the sensitivity parameter and an X-axis shake detection parameter. The Z-axis first threshold can include a ratio between the sensitivity parameter and a Z-axis shake detection parameter. Additionally, a Y-axis first threshold including a ration between the sensitivity parameter and a Y-axis shake detection parameter can be implemented. Of course, there can be other variations, modifications, and alternatives.

In a specific embodiment, the method step of determining the tracking point data includes sampling two or more consecutive points in (x, y, z) axis data. The difference between the first point in (x, y, z) axis data and the last point in (x, y, z) axis data of the consecutive points can be compared to one or more second threshold values. The one or more second threshold values can include a ratio between a sensitivity parameter and a movement parameter. The one or more second threshold values can include an X-axis second threshold value and a Z-axis second threshold value. The X-axis second threshold value can include a ratio between the sensitivity parameter and an X-axis movement parameter. The Z-axis second threshold can include a ratio between the sensitivity parameter and a Z-axis movement parameter. A Y-axis second threshold can also be implemented, where the Y-axis second threshold includes a ratio between the sensitivity parameter and a Y-axis movement parameter. In a specific embodiment, the thresholds sued for the initial perturbation data and the tracking point data can include an combination of the X, Y, and Z first or second threshold values.

Furthermore, the last point in (x, y, z) data from the one or more track data can be compared to one or more third threshold values and one or more fourth threshold values. The one or more third threshold values can include a ratio between the sensitivity parameter and a position parameter. For example, the one or more third threshold values can include an X-axis, Y-axis, and Z-axis third threshold values. Each of these third threshold values can include a ratio between the sensitivity parameter and an X-axis, Y-axis, or Z-axis position parameter, respectively. Similarly, the one or more fourth threshold values can include an X-axis, Y-axis, and Z-axis fourth threshold values, where each of these value can include a ratio between the sum of the sensitivity parameter and an X-offset, Y-offset, or a Z-offset value and a Z-axis positive position parameter, respectively. The method can include determining an action to perform based on whether the initial perturbation data exceeds one or more first thresholds, whether the tracking point data exceeds one or more second thresholds, and whether the stable position data exceeds one or more third and fourth thresholds. Of course, there can be other variations, modifications, and alternatives.

The portable proximity device can include a physical sensor and a processor configured to perform these steps. The portable device can include a physical sensor configured to determine the initial perturbation data, the tracking point data, and the stable position data. The physical sensor can include an accelerometer, a gyro sensor, a magnetic field sensor, or other MEMS physical sensor, or combination thereof. The physical sensor can be coupled to a processor, which can be programmed to determine an action to perform based on these data and whether they exceed the thresholds described previously.

Figure 7:
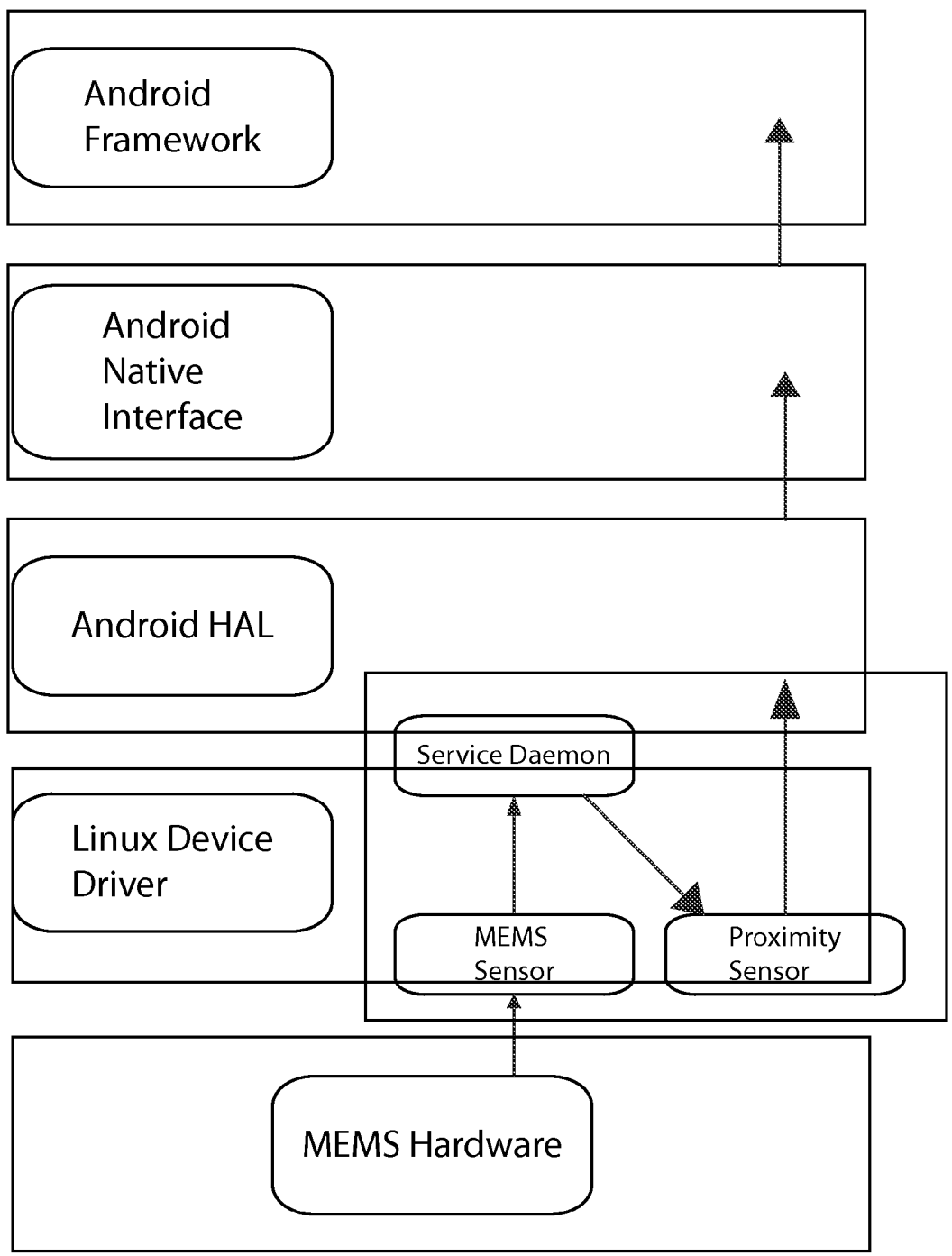
FIG. 7 illustrates a simplified block diagram of a MEMS proximity sensor system according to an embodiment of the present invention.

FIG. 7 illustrates a simplified block diagram of a MEMS proximity sensor system according to an embodiment of the present invention. This diagram shows the interaction between the MEMS hardware and software interface of a portable device operating on an Android operating system. The sensors are configured through the Linux device driver and controlled by the service daemon. The sensors operate communicate through the Android HAL (Hardware Abstraction Layer) to the Android Native Interface of the Android framework. Other frameworks and interfaces can be used in various embodiments of a portable device implementing a MEMS proximity sensor system.

Figure 8:
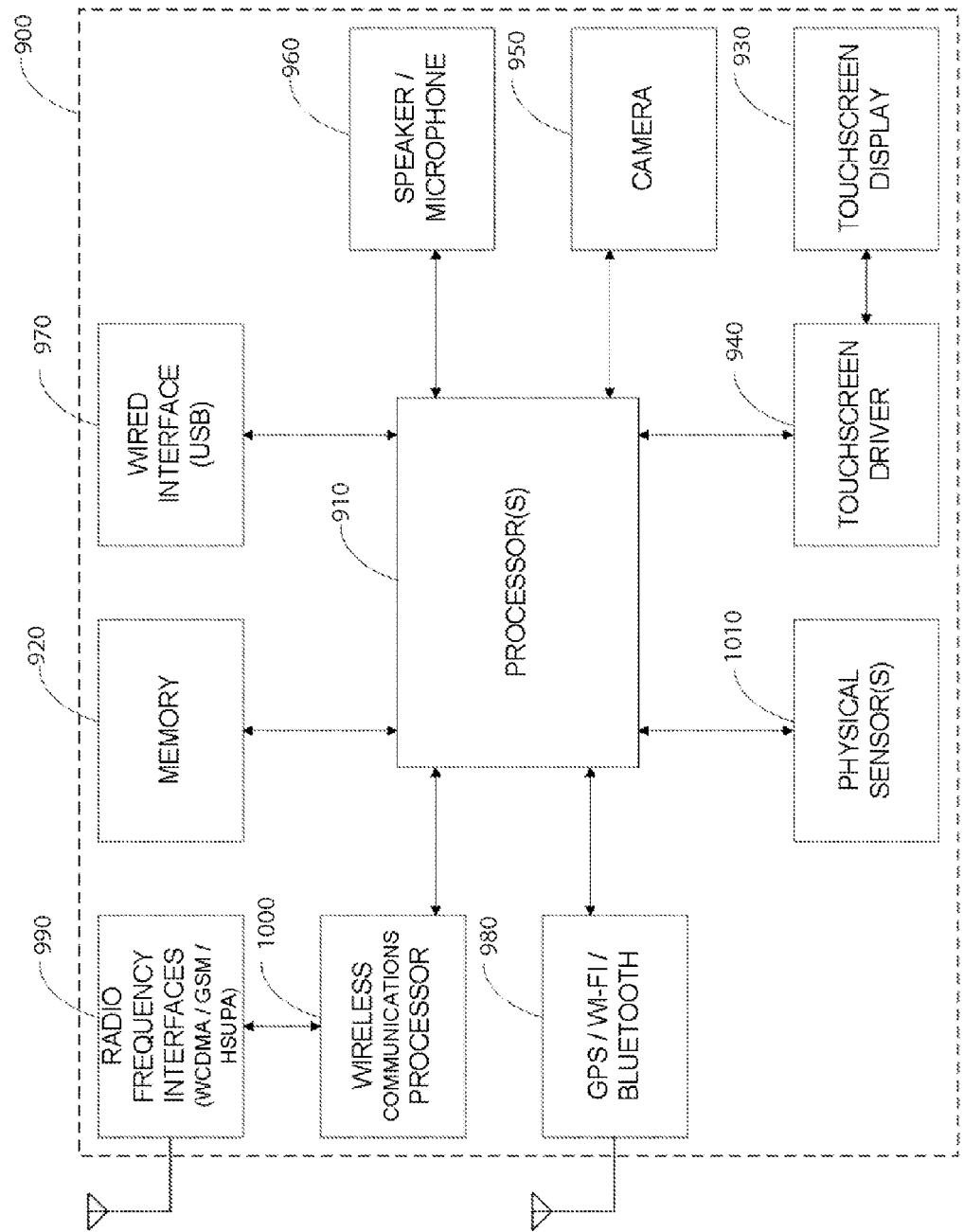
FIG. 8 illustrates a simplified functional block diagram of various embodiments of the present invention.

FIG. 8 illustrates a functional block diagram of various embodiments of the present invention. In FIG. 8, a computing device 900 typically includes an applications processor 910, memory 920, a touch screen display 930 and driver 940, an image acquisition device 950, audio input/output devices 960, and the like. Additional communications from and to computing device are typically provided by via a wired interface 970, a GPS/Wi-Fi/Bluetooth interface 980, RF interfaces 990 and driver 1000, and the like. Also included in various embodiments are physical sensors 1010.

In various embodiments, computing device 900 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 900 may include one or more processors 910. Such processors 910 may also be termed application processors, and may include a processor core, a video/graphics core, and other cores. Processors 910 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 920 may include different types of memory (including memory controllers), such as flash memory (e.g. NOR, NAND), pseudo SRAM, DDR SDRAM, or the like. Memory 920 may be fixed within computing device 900 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 930 and driver 940 may be based upon a variety of later-developed or current touch screen technology including resistive displays, capacitive displays, optical sensor displays, electromagnetic resonance, or the like. Additionally, touch screen display 930 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 950 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 960 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 910 to enable the user to operate computing device 900 by stating voice commands. Additionally, a speech engine may be provided in various embodiments to enable computing device 900 to provide audio status messages, audio response messages, or the like.

In various embodiments, wired interface 970 may be used to provide data transfers between computing device 900 and an external source, such as a computer, a remote server, a storage network, another computing device 900, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 980 may also be provided to provide wireless data transfers between computing device 900 and external sources, such as computers, storage networks, headphones, microphones, cameras, or the like. As illustrated in FIG. 8, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 8, GPS functionality is included as part of wireless interface 980 merely for sake of convenience, although in implementation, such functionality is currently performed by circuitry that is distinct from the Wi-Fi circuitry and distinct from the Bluetooth circuitry.

Additional wireless communications may be provided via RF interfaces 990 and drivers 1000 in various embodiments. In various embodiments, RF interfaces 990 may support any future-developed or conventional radio frequency communications protocol, such as CDMA-based protocols (e.g. WCDMA), GSM-based protocols, HSUPA-based protocols, or the like. In the embodiments illustrated, driver 1000 is illustrated as being distinct from applications processor 910. However, in some embodiments, these functionalities are provided upon a single IC package, for example the Marvel PXA330 processor, and the like. It is contemplated that some embodiments of computing device 900 need not include the RF functionality provided by RF interface 990 and driver 1000.

FIG. 8 also illustrates computing device 900 to include physical sensors 1010. In various embodiments of the present invention, physical sensors 1010 can be single axis or multi-axis Micro-Electro-Mechanical Systems (MEMS) based devices being developed by M-cube, the assignee of the present patent application. Physical sensors 1010 can include accelerometers, gyroscopes, pressure sensors, magnetic field sensors, bio sensors, and the like. In other embodiments of the present invention, conventional physical sensors 1010 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 930 and driver 940 and inputs/or outputs to physical sensors 1010 may be processed in parallel processing threads. In other embodiments, such events or outputs may be processed serially, or the like. Inputs and outputs from other functional may also be processed in parallel or serially, in other embodiments of the present invention, such as image acquisition device 950 and physical sensors 1010.

FIG. 8 is representative of one computing device 900 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 8. For example, in various embodiments, computing device 900 may lack image acquisition unit 950, or RF interface 990 and/or driver 1000, or GPS capability, or the like. Additional functions may also be added to various embodiments of computing device 900, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

In an embodiment, the present invention relates to a Virtual Proximity Sensor Algorithm, which is a solution for replacing the proximity sensor hardware. This algorithm applied as a proximity sensor system and method of operating therefor can be referred to as "CallSense 2.0". According to an embodiment, there are two highlights about this algorithm. First, the algorithm exhibits high frequency and high resolution (14 bit resolution and +/−8 g range for the sensor with software 50 Hz sampling rate) collection of accelerometer data for tracing the pick-up/get-away gesture of the handheld devices. Second, the algorithm takes the accelerometer and touch panel proximity signal into consideration as a final result of proximity status, using the Close/Far Away status as hardware proximity sensor's function.

Figure 9:
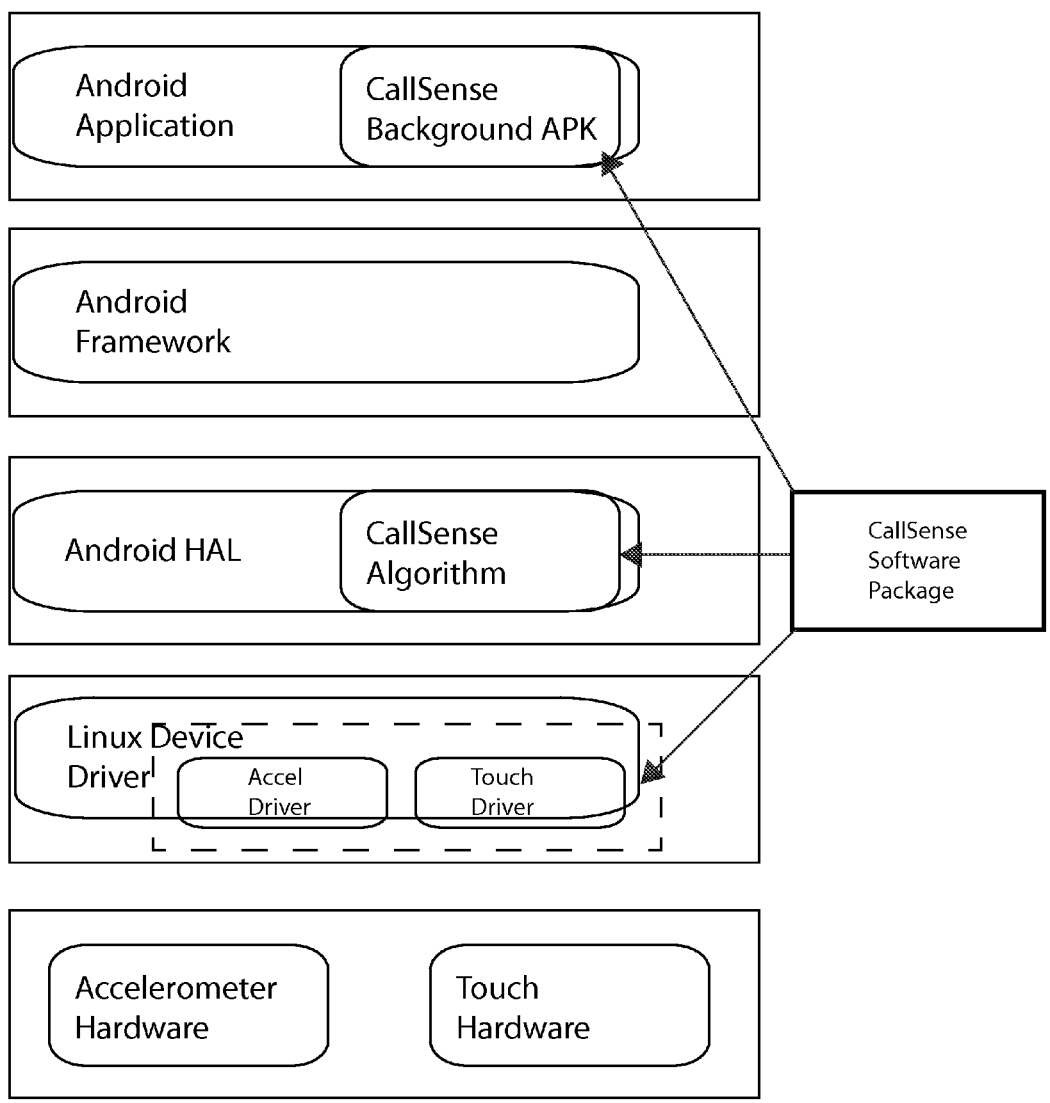
FIG. 9 illustrates a simplified block diagram of a MEMS proximity sensor system according to an embodiment of the present invention.

FIG. 9 illustrates a simplified block diagram of a MEMS proximity sensor system according to an embodiment of the present invention. This diagram shows the interaction between a "CallSense Software Package", referring to implementations of the present invention, with a computer system architecture. Implementations of the CallSense method and systems configured for the CallSense method can use the "CallSense 1.0", "CallSense 2.0" embodiment, or other variation of these embodiments that will be recognized by those of ordinary skill in the art. In this system, the MEMS hardware, shown as the Accelerometer hardware and Touch hardware, of a portable device are operating on an Android operating system. The sensors, Accel and Touch hardware, are configured through the Linux device driver, which can be controlled by the service daemon. As shown, the CallSense Software Package can interact with the system at multiple levels, including the device drivers (Accel and Touch) at the Linux Device Driver level, the Android HAL level via a CallSense algorithm, and the Android Application level via a CallSense Background APK. Other frameworks and interfaces can be used in various embodiments of a portable device implementing a MEMS proximity sensor system.

The Touch Panel and Accelerometer detect Close status detections have their own weaknesses. The Touch Panel may be impacted by temperature, humidity, and stress (deformation). The accelerometer only supports a standard gesture of "pick up" and "answer call" (running, lying down, in the shaking transport and so on will have impacts). By adopting both sensor hardware and jointing operating them in the methods of the present invention benefits from a two way advantage to improve the Close detect accuracy. Other benefits can include saving the hardware proximity sensor cost in handheld BOM list and improving the accuracy of the Accel only (CallSense 1.0) solution.

Figure 10:
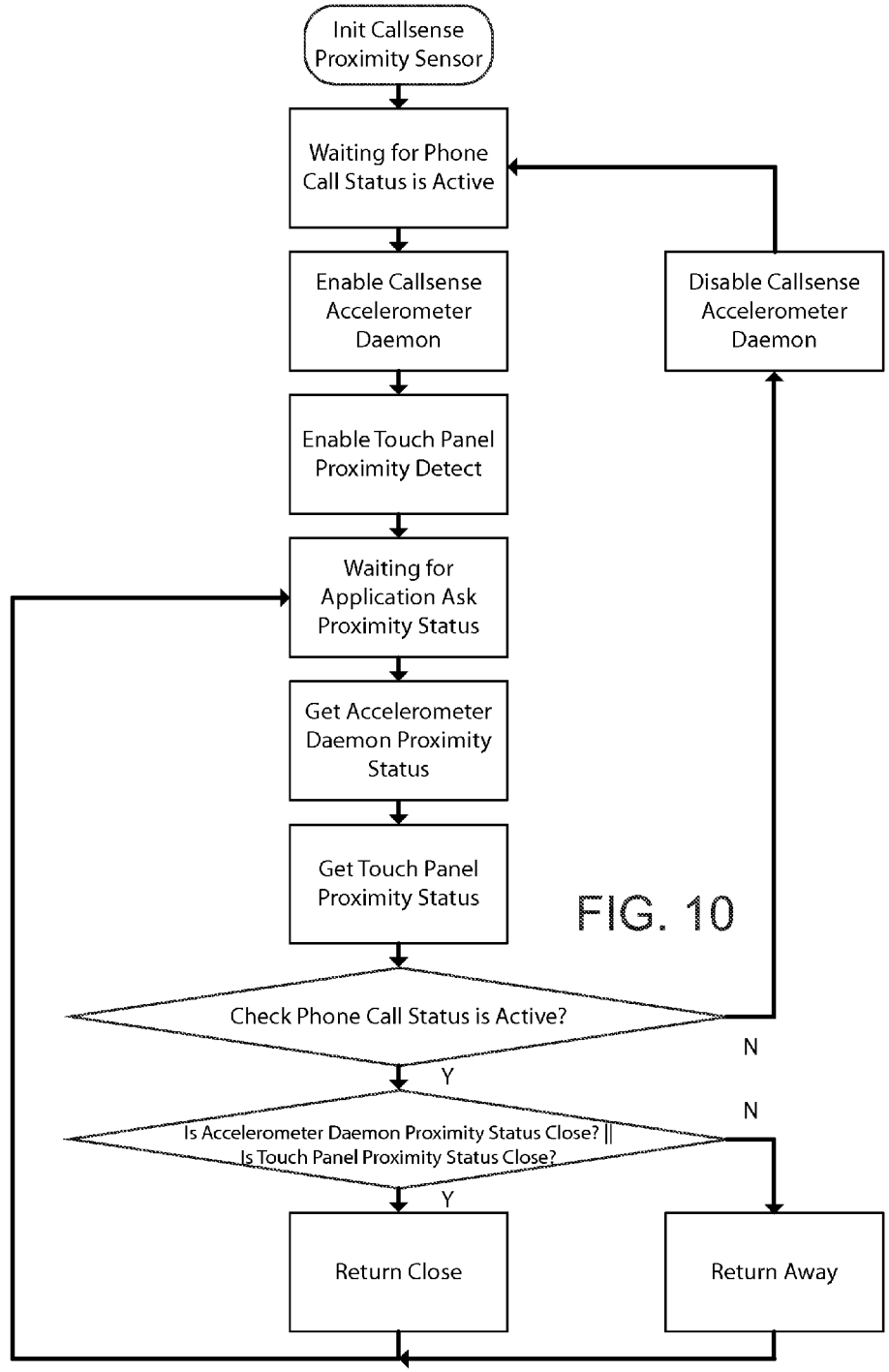
FIG. 10 illustrates a simplified flow diagram of a method for operating a MEMS proximity sensor device according to an embodiment of the present invention.

FIG. 10 illustrates a simplified flow diagram of a method for operating a MEMS proximity sensor device according to an embodiment of the present invention. This flow diagram can represent a main flow diagram for a method of operating a proximity sensor system. The method begins with initializing the proximity sensor system, waiting for a "Phone Call Status" to become active, enabling an Accelerometer Daemon process, and enabling a Touch Panel Proximity Detect process. The method then involves waiting for an application to ask for the proximity status, getting a Accelerometer Daemon Proximity Status, and getting a Touch Panel Proximity Status.

Then, a first query, a "Check Phone Call Status is Active?" process, is encountered. If the phone call status is not active, then the method disables the Accelerometer Daemon and returns through a first loop back to the step of "Waiting for Phone Call status is Active". If the phone call status is active, then a second query, "Is Accelerometer Daemon Proximity Status Close?" or "Is Touch Panel Proximity Status Close?", is encountered. If the either proximity status is close, then the method returns a "Close" value, and if neither status is close, then an "Away" value is returned. Following this value return, the method returns through a second loop back to the method step of waiting for an application to request the proximity status.

In an embodiment, the present invention can include a method of operating a proximity sensor system. The method can include initializing the proximity sensor system, waiting for an active status, enabling a first sensor service daemon, and enabling a second sensor service daemon. The proximity sensor system can include a first and second sensor device, which can be an accelerometer and a touch panel, respectively. The active status can be associated with a phone call status. The first sensor service daemon and the second sensor service daemon can be associated with the first and second sensors, respectively. The method can then execute three different process loops:

The first loop process can include receiving a status request from an application, retrieving a first sensor status from the first sensor service daemon, retrieving a second sensor status from the second sensor service daemon, receiving an active status, determining a close status from the first sensor status or from the second sensor status, and returning a close value.

The second loop process can include: receiving a status request from an application, retrieving a first sensor status from the first sensor service daemon, retrieving a second sensor status from the second sensor service daemon, receiving an active status, determining an away status from the first sensor status and from the second sensor status, and returning an away value.

The third loop process can include: receiving a status request from an application, retrieving a first sensor status from the first sensor service daemon, retrieving a second sensor status from the second sensor service daemon, receiving an inactive status, disabling the first sensor service daemon, waiting for the active status, enabling the first sensor service daemon, and enabling the second sensor service daemon.

Figure 11:
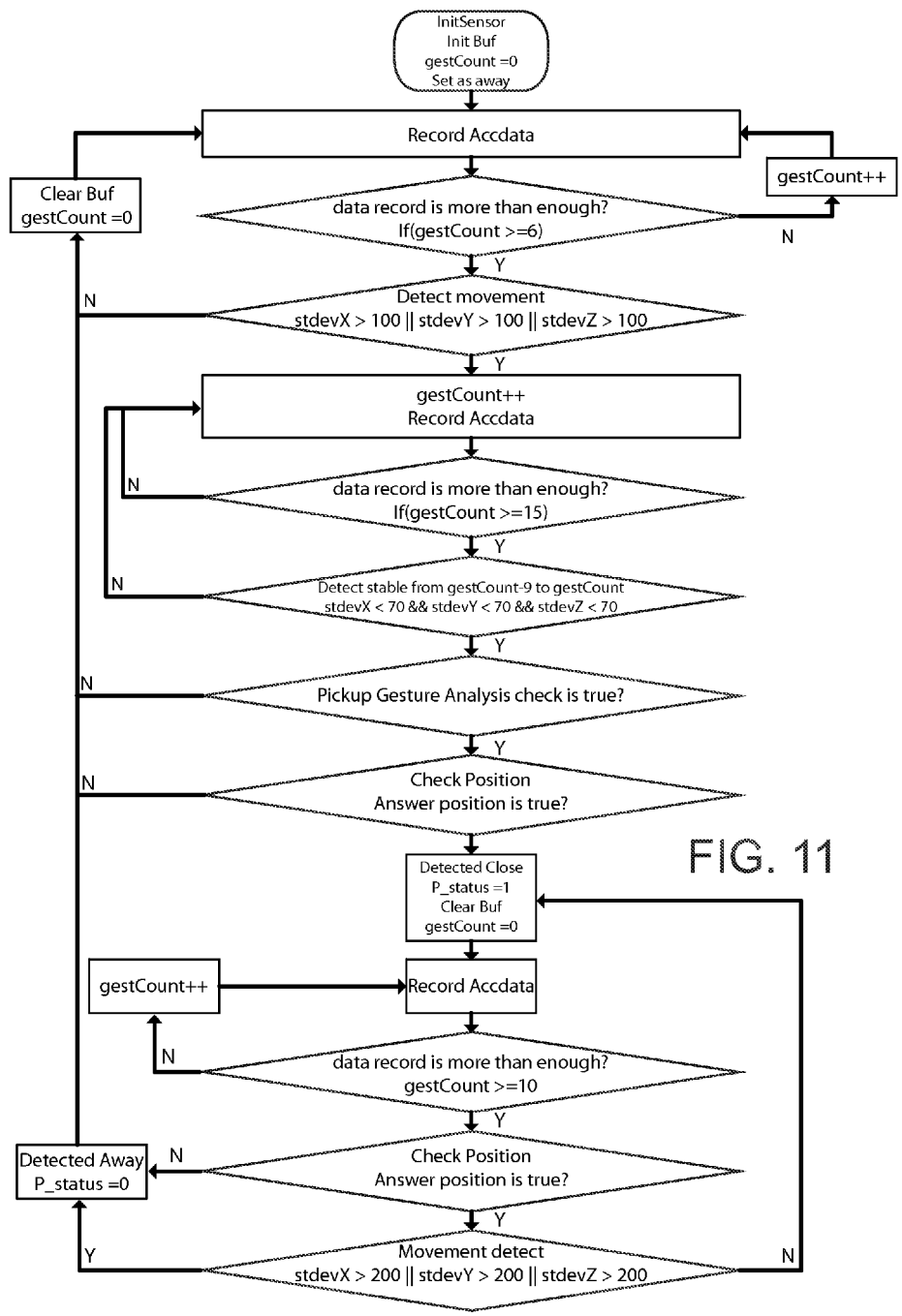
FIG. 11 illustrates a simplified flow diagram of a method for operating a MEMS proximity sensor device according to an embodiment of the present invention.

FIG. 11 illustrates a simplified flow diagram of a method for operating a MEMS proximity sensor device according to an embodiment of the present invention. This flow diagram can represent a flow diagram for an accelerometer tracking detection portion of a method of operating a proximity sensor system. The method begins with initializing the proximity sensor system, initializing a buffer, setting a gestCount value to zero, and setting a proximity status as "Away". The method can include recording an accelerometer data and presenting a query regarding if a data record is more than enough, i.e. If(gestCount>=6). If this query is not satisfied, then the gestCount is incremented and the method loops back to the recording of accelerometer data.

If the query is satisfied, then another query regarding the movement detection is presented. This query can involve determining if a standard deviation of any of the axis measurements (i.e. stdevX, stdevY, or stdevZ) exceeds a predetermined value, such as 100. If this query is not satisfied, then the buffer is cleared and the gestCount is set to zero. If the query is satisfied, then the method can proceed to increment the gestCount and record accelerometer data.

Another query regarding if the data record is more than enough, i.e. If(gestCount>=15), can be presented. If this query is not satisfied, then the method loops pack to incrementing the gestCount and recording Accdata. If the query is satisfied, then another query regarding the movement detection is presented. This query can include detecting a stable condition from gestCount-9 to gestCount and determining whether the standard deviation of measurements on all axis are less than another predetermined value (i.e. stdev<70). If this query is not satisfied, then the method loops back to incrementing the gestCount and recording Accdata.

Another query can then be presented; this query checks whether a pickup gesture analysis registers as true. If the query is not satisfied, the method loops back to clearing the buffer, setting the gestCount to zero, and starting at the beginning recording of Accdata. If the query is satisfied, the method proceeds to another query about whether a check position answer position is true. If this query is not satisfied, the method also loops back to clearing the buffer, setting the gestCount to zero, and starting at the beginning recording of Accdata. If the query is satisfied, then the method proceeds to a new status.

In the new status, a close status is set, a P_status value is set to one, the buffer is cleared, and the gestCount is set to zero. The method proceeds to recording Accdata and checking if gestCount is greater than or equal to yet another value, i.e. 10. If this comparison is not satisfied, then the gestCount is incremented and the method loops back to the recording of Accdata under this new status. If the comparison is satisfied, then the method proceeds to the check position answer position. If this query returns false, then an away status is set, P_status is set to zero, and the method loops back to clearing the buffer, setting the gestCount to zero, and recording the Accdata from the top of the flow diagram. If this query returns true, then another movement detect query is presented. If any of the standard deviations measured of any axis exceeds another value, i.e. stdev>200, then the away status is set, P_status is set to 0, and the method loops back to clearing the buffer, setting the gestCount to zero, and recording the Accdata from the top of the flow diagram. If the query returns false, then the method returns to setting a close status, setting P_status to one, clearing the buffer, setting the gestCount to zero, and recording Accdata in the lower process loop.

In an embodiment, the present invention can include a method of operating a proximity sensor system. The method can include initializing the proximity sensor system, initializing a buffer, setting a count value to zero, and setting a proximity status as "Away". The proximity sensor system can include a first and second sensor device, which can be an accelerometer and a touch panel, respectively. The method can include executing a record sensor data process that detects gestures and records a standard deviation of movement along an X, Y, and Z axis. This process engages in a first process loop that increments the count, which can be a gesture count, until the count exceeds a first count threshold and the standard deviations on any axis exceeds a first deviation threshold.

The method includes following the previously discussed process loop with a second process loop including incrementing the count until the count value exceeds a second count threshold and a stable status is detected via the standard deviation on all axes is less than a second deviation value. The method follows to determine that a gesture check is true and a position check is true.

The method includes following the secondly discussed process loop with a third process loop including setting a detection status to close, clearing the buffer, and setting the count to zero. The record sensor data process is executed again and the count is incremented until it exceeds a third threshold. The executed record sensor data process continues until a position check is determined to be true and the standard deviation measured on any axis is greater than a third deviation threshold. After which the detection status is set to away. The method can clears the buffer and sets the count to zero and the method resumes from the top of the process flow.

Figure 12:
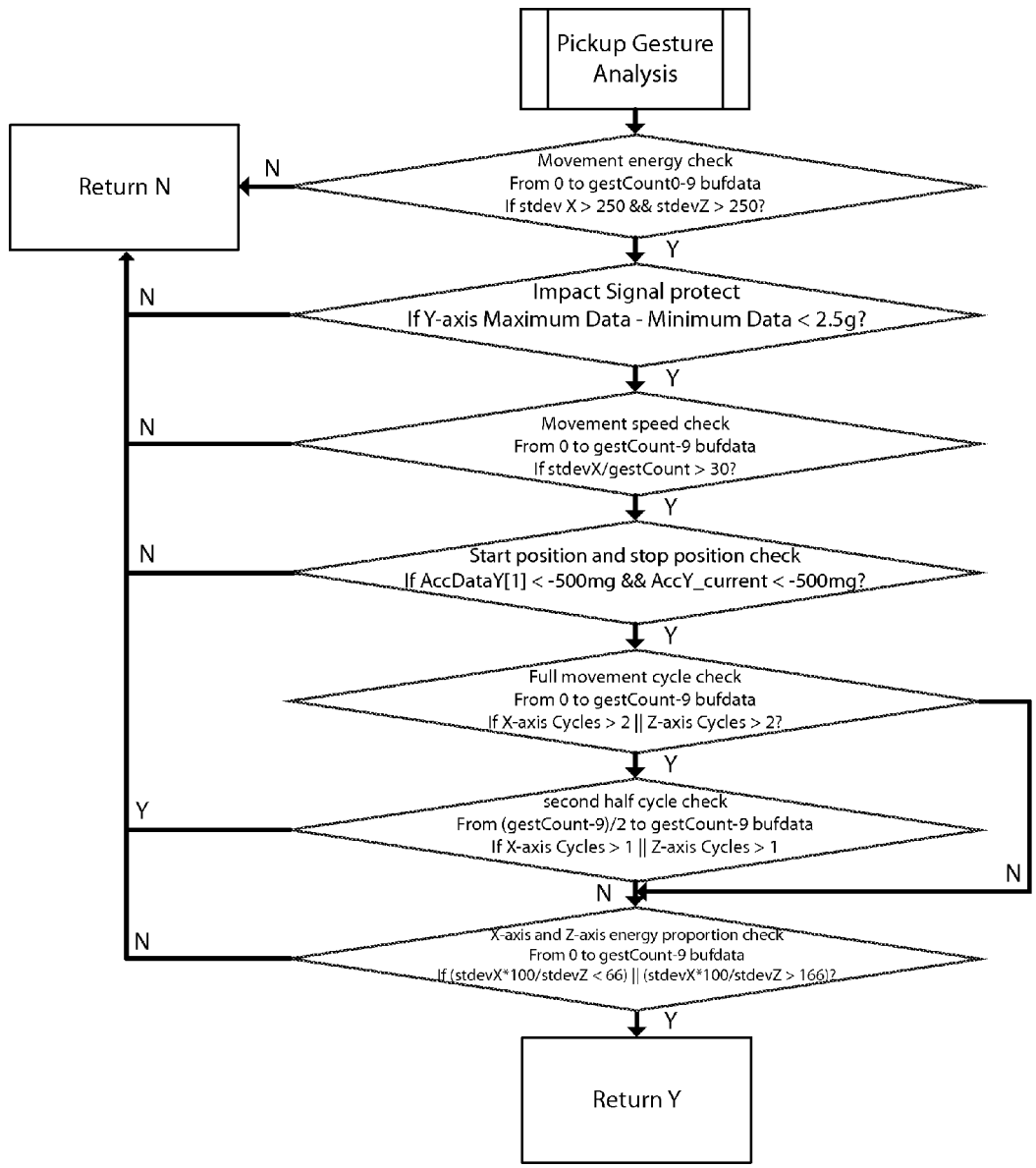
FIG. 12 illustrates a simplified flow diagram of a method for operating a MEMS proximity sensor device according to an embodiment of the present invention.

FIG. 12 illustrates a simplified flow diagram of a method for operating a MEMS proximity sensor device according to an embodiment of the present invention. This flow diagram can represent a flow diagram for a gesture check for a method of operating a proximity sensor system. The method includes a series of queries involving conditions such as a standard deviation value being greater than a first gesture deviation value, i.e. 250, on one or more of the X, Y, and Z axes. The queries can include checking whether the difference between a maximum data and a minimum data is less than a data difference threshold, i.e. 2.5 g. The queries can also include checking whether a standard deviation measured on any axis divided by a gesture count is less than a deviation gesture ratio, i.e. 30. A start and stop position check can be included wherein a recorded data on one or more of the axes is checked to be less than a start stop threshold, i.e. −500 mg. A full movement cycle check can be included wherein the number of cycles on any of the measured axes is checked to be greater than a full cycle threshold, i.e. 2. Also, a half cycle check can be included wherein the number of cycles on any of the measured axes is checked to be greater than a half cycle threshold, i.e. 1. Furthermore, an energy proportion check can be included wherein it is determined whether a ratio of a measured standard deviation on a first axis to a measured standard deviation on a second axis exceeds a first energy proportion ratio, i.e. 66, or whether the inverted ratio ($2^{nd}$ stdev/$1^{st}$ stdev) exceeds a second energy proportion ratio, i.e. 166.

In a specific embodiment, these queries can be ordered in a specific fashion. In the case of the full movement cycle check, a false return leads to the method jumping to the energy proportion check. A false return on the half cycle check can lead to the energy proportion check as well. Otherwise, each of the queries listed above can follow to the next on a return true, with the true return of the energy proportion check resulting in a return of an overall true or yes value. All other false returns on the other queries can result in the return of an overall false or no value.

Figure 13:
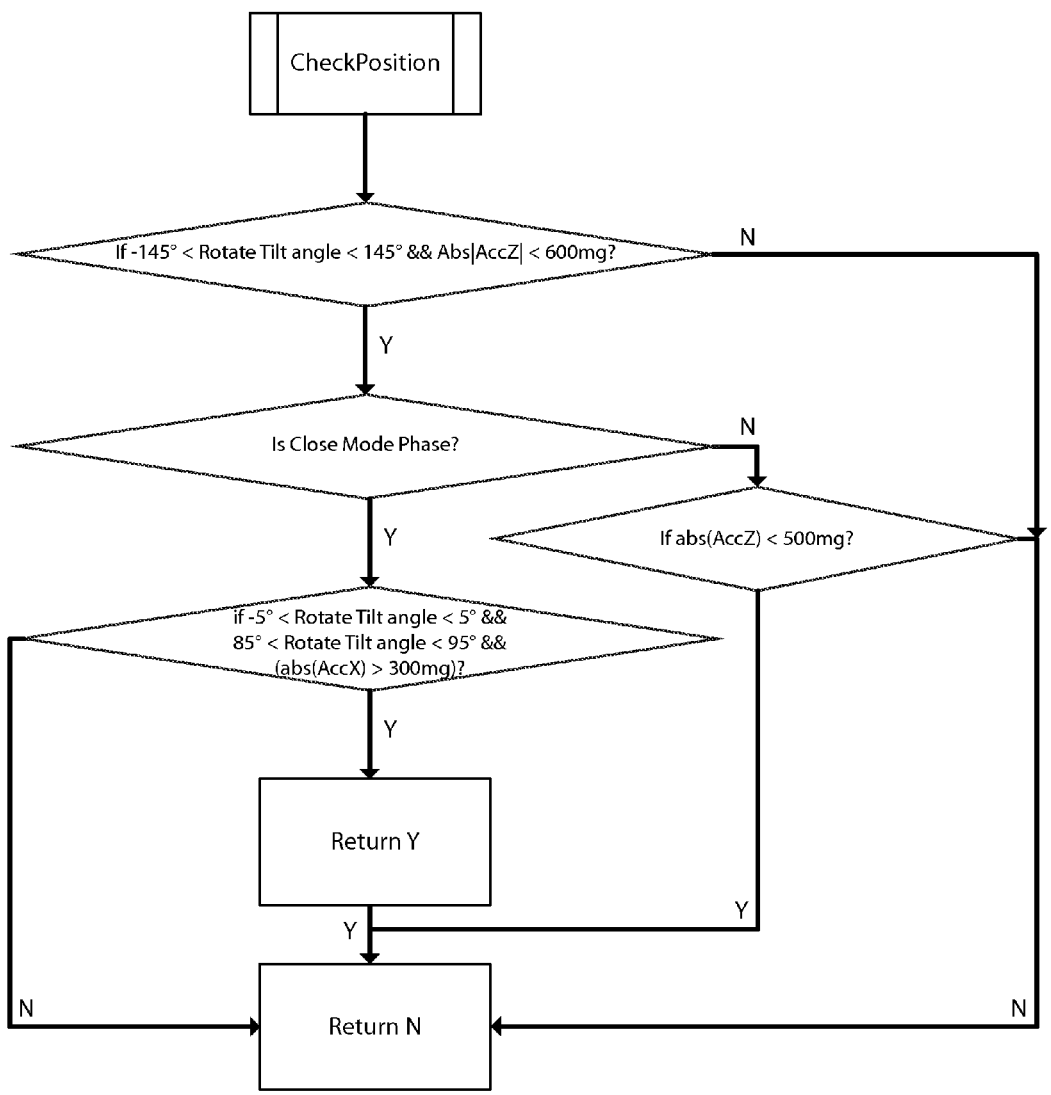
FIG. 13 illustrates a simplified flow diagram of a method for operating a MEMS proximity sensor device according to an embodiment of the present invention.

FIG. 13 illustrates a simplified flow diagram of a method for operating a MEMS proximity sensor device according to an embodiment of the present invention. This flow diagram can represent a flow diagram for a position detect process for a method of operating a proximity sensor system. The method begins by checking whether a rotate tile angle is greater than a first angle threshold and less than a second angle threshold, i.e. −145 degrees and 145 degrees, respectively, as well as checking that the absolute value of a measured data on one or more axes is less than a first absolute value threshold, i.e. 600 mg. If the query returns false, then the position detect process returns false or no (N).

Following this query, the method can check whether the system is in a close mode phase, i.e. position status is close. If the status is not close, then the method checks if the absolute value of a measured data on one or more axes is less than a second absolute value threshold, i.e. 500 mg. If the status is close, another query is presented regarding whether the rotate tilt angle is less greater than a third angle threshold, i.e. −5 degrees, and less than a fourth angle threshold, i.e. 5 degrees, and whether the rotate tilt angle is greater than a fifth angle threshold, i.e. 85 degrees, and less than a sixth angle threshold, i.e. 95 degrees, and whether an absolute value of a measured data on one or more axes is greater than a third absolute value threshold, i.e. 300 mg. If this query returns true, then the position detect process returns true or yes (Y). Otherwise, the process returns false or no (N).

In an embodiment, the present invention can include a method of operating a proximity sensor system. The methods and sub-methods described previously can be added together, interchanged, and reordered depending on the specific application. The process flow described previously merely includes examples, which can be expanded or contracted depending on application. Variations, modifications, and alternatives will be recognized by those of ordinary skill in the art.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for proximity detection implemented on a portable device programmed to perform the method comprising:
    determining, with a physical sensor of the portable device, an initial perturbation data including previous state data and current state data;
    determining, with the physical sensor of the portable device, a tracking point data including one or more track data;
    determining, with the physical sensor of the portable device, a stable position data using the tracking point data; and
    determining, with a processor of the portable device, an action to perform based on the initial perturbation data, the tracking point data, and the stable position data.

2. The method of claim 1 further comprising comparing, by the processor of the portable device, the difference between the previous state data and the current state data to one or more first threshold values.

3. The method of claim 2 wherein each of the one or more first threshold values comprises a ratio between a sensitivity parameter and a shake detection parameter.

4. The method of claim 3 wherein initial perturbation data includes X-axis perturbation data and Z-axis perturbation data, and wherein the one or more first threshold values includes:
an X-axis first threshold value comprising a ratio between the sensitivity parameter and an X-axis shake detection parameter, and
a Z-axis first threshold value comprising a ratio between the sensitivity parameter and a Z-axis shake detection parameter.

5. The method of claim 1 wherein the determining of the tracking point data includes sampling a two or more consecutive points in (x, y, z) axis data.

6. The method of claim 5 further comprising comparing, by the processor of the portable device, the difference between the first point in (x, y, z) axis data and the last point in (x, y, z) axis data to one or more second threshold values.

7. The method of claim 6 wherein each of the one or more second threshold values comprises a ratio between a sensitivity parameter and a movement parameter.

8. The method of claim 7 wherein the one or more second threshold values includes:
an X-axis second threshold value comprising a ratio between the sensitivity parameter and an X-axis movement parameter, and
a Z-axis second threshold value comprising a ratio between the sensitivity parameter and a Z-axis movement parameter.

9. The method of claim 5 further comprising comparing, by the processor of the portable device, the last point in (x, y, z) data from the one or more track data to one or more third threshold values and one or more fourth threshold values.

10. The method of claim 9 wherein each the one or more third threshold values comprises a ratio between the sensitivity parameter and a position parameter.

11. The method of claim 10 wherein the one or more third threshold values includes:
an X-axis third threshold value comprising a ratio between the sensitivity parameter and an X-axis position parameter,
a Y-axis third threshold value comprising a ratio between the sensitivity parameter and a Y-axis position parameter, and
a Z-axis third threshold value comprising a ratio between the sum of the sensitivity parameter and a Z-offset value and a Z-axis negative position parameter.

12. The method of claim 9 wherein each of the one or more fourth threshold values comprises the sum of the sensitivity parameter and an offset value.

13. The method of claim 12 wherein the one or more fourth threshold values includes:
an X-axis fourth threshold value comprising the sum of the sensitivity parameter and an X-offset value,
a Y-axis fourth threshold value comprising the sum of the sensitivity parameter and a Y-offset value, and
a Z-axis fourth threshold value comprising the ratio between the sum of the sensitivity parameter and a Z-offset value and a Z-axis positive position parameter.

14. The method of claim 1 wherein the determining of the action to perform includes:
determining whether the initial perturbation data exceeds one or more first thresholds,
determining whether the tracking point data exceeds one or more second thresholds, and
determining whether the stable position data exceeds one or more third and fourth thresholds.

15. The method of claim 1 wherein the physical sensor comprises an accelerometer, a gyro sensor, a magnetic field sensor, or a MEMS physical sensor.

16. A portable device for determining proximity of a user comprising:
a physical sensor configured to determine an initial perturbation data including previous state data and current state data, a tracking point data including one or more track data, and a stable position data using the tracking point data;
a processor coupled to the physical sensor, wherein the processor is programmed to determine an action to perform based on the initial perturbation data, the tracking point data, and the stable position data.

17. The device of claim 16 wherein the processor is programmed to compare the difference between the previous state data and the current state data to one or more first threshold values.

18. The device of claim 17 wherein each of the one or more first threshold values comprises a ratio between a sensitivity parameter and a shake detection parameter.

19. The device of claim 18 wherein initial perturbation data includes X-axis perturbation data and Z-axis perturbation data, and wherein the one or more first threshold values includes:
an X-axis first threshold value comprising a ratio between the sensitivity parameter and an X-axis shake detection parameter, and
a Z-axis first threshold value comprising a ratio between the sensitivity parameter and a Z-axis shake detection parameter.

20. The device of claim 16 wherein the determining of the tracking point data includes sampling two or more consecutive points in (x, y, z) axis data.

21. The device of claim 20 wherein the processor is programmed to compare the difference between the first point in (x, y, z) axis data and the last point in (x, y, z) axis data to one or more second threshold values.

22. The device of claim 21 wherein each of the one or more second threshold values comprises a ratio between a sensitivity parameter and a movement parameter.

23. The device of claim 22 wherein the one or more second threshold values includes:
an X-axis second threshold value comprising a ratio between the sensitivity parameter and an X-axis movement parameter, and
a Z-axis second threshold value comprising a ratio between the sensitivity parameter and a Z-axis movement parameter.

24. The device of claim 20 wherein the processor is programmed to compare the last point in (x, y, z) data from the one or more track data to one or more third threshold values and one or more fourth threshold values.

25. The device of claim 24 wherein each the one or more third threshold values comprises a ratio between the sensitivity parameter and a position parameter.

26. The device of claim 25 wherein the one or more third threshold values includes:
an X-axis third threshold value comprising a ratio between the sensitivity parameter and an X-axis position parameter,
a Y-axis third threshold value comprising a ratio between the sensitivity parameter and a Y-axis position parameter, and
a Z-axis third threshold value comprising a ratio between the sum of the sensitivity parameter and a Z-offset value and a Z-axis negative position parameter.

27. The device of claim 24 wherein each of the one or more fourth threshold values comprises the sum of the sensitivity parameter and an offset value.

28. The device of claim 27 wherein the one or more fourth threshold values includes:
- an X-axis fourth threshold value comprising the sum of the sensitivity parameter and an X-offset value,
- a Y-axis fourth threshold value comprising the sum of the sensitivity parameter and a Y-offset value, and
- a Z-axis fourth threshold value comprising the ratio between the sum of the sensitivity parameter and a Z-offset value and a Z-axis positive position parameter.

29. The device of claim 16 wherein the determining of the action to perform includes:
- determining whether the initial perturbation data exceeds one or more first thresholds,
- determining whether the tracking point data exceeds one or more second thresholds, and
- determining whether the stable position data exceeds one or more third and fourth thresholds.

30. The device of claim 16 wherein the physical sensor comprises an accelerometer, a gyro sensor, a magnetic field sensor, or a MEMS physical sensor.

\* \* \* \* \*